Oct. 20, 1964     A. O. B. TIPTON     3,153,477
CONVEYOR BELT SYSTEMS
Filed July 30, 1962     3 Sheets-Sheet 1
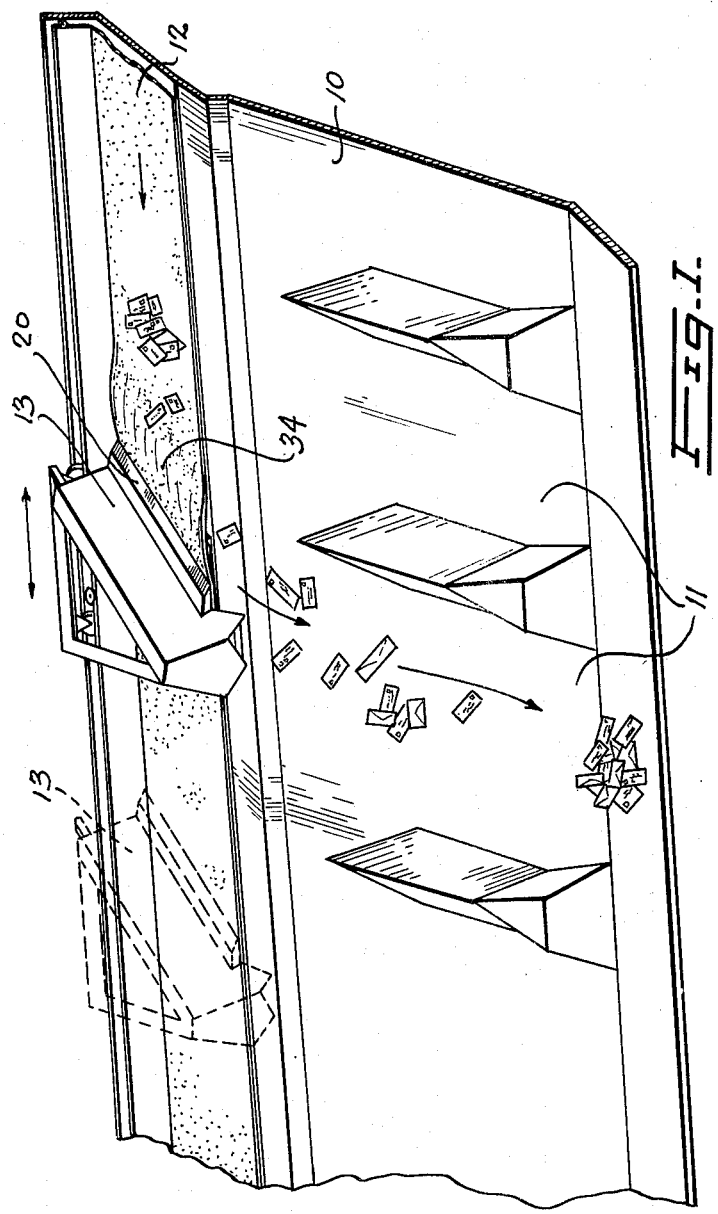
Inventor
Archibald O. B Tipton
By Stevens Davis Miller & Mosher
Attorneys

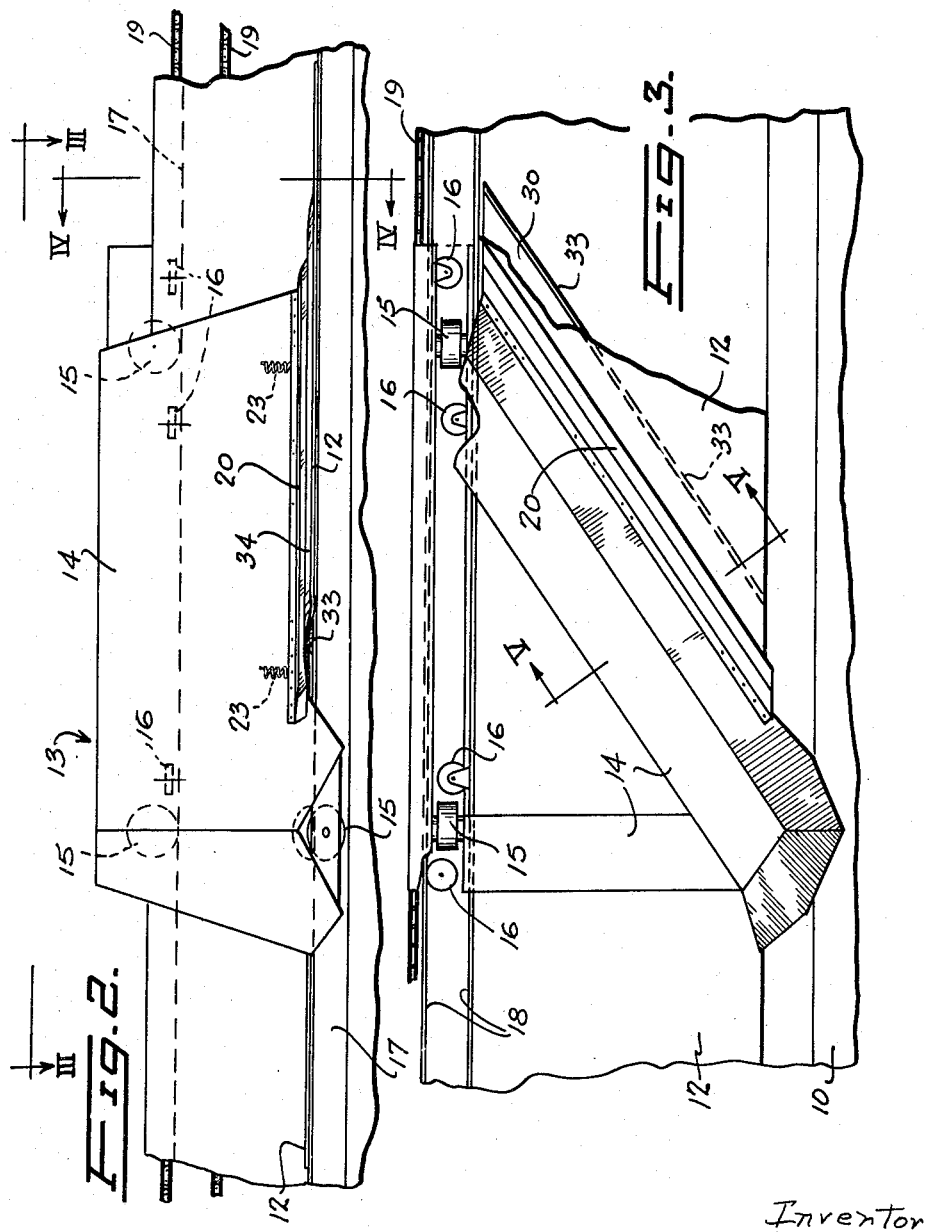

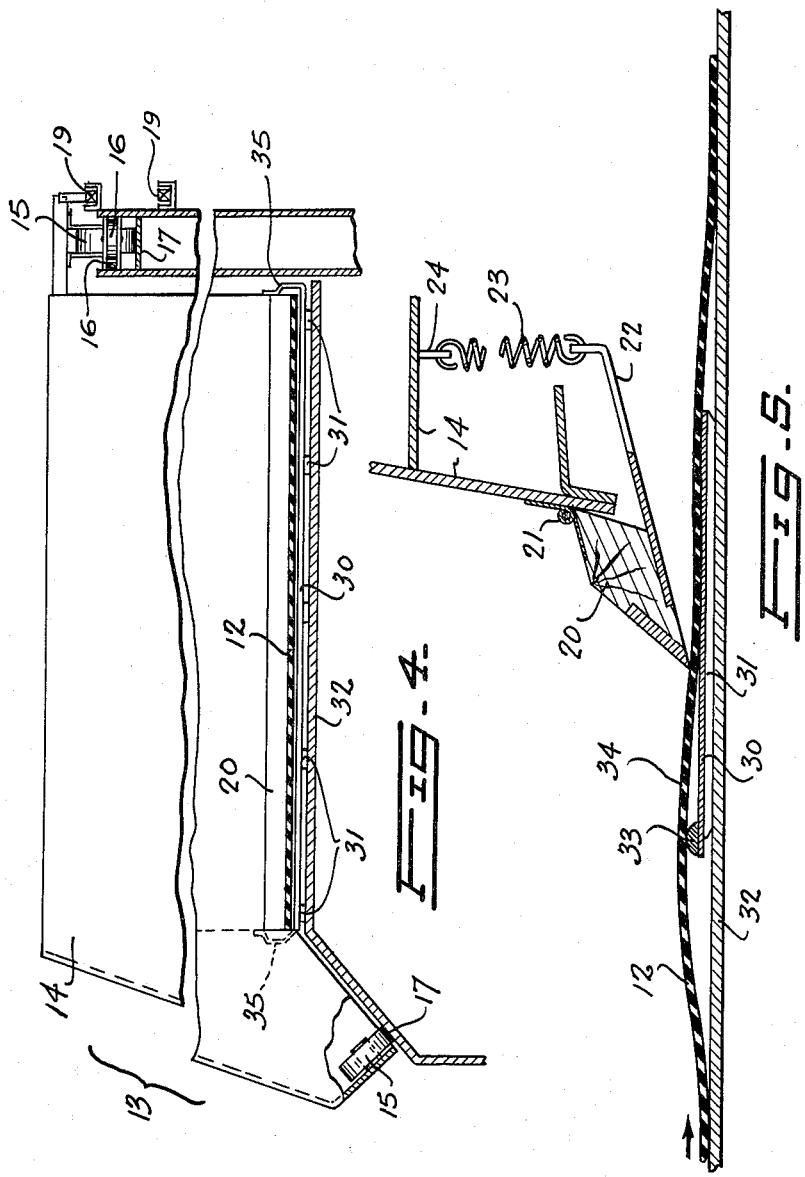

United States Patent Office 3,153,477
Patented Oct. 20, 1964

3,153,477
CONVEYOR BELT SYSTEMS
Archibald O. B. Tipton, Richmond, Vancouver, British Columbia, Canada, assignor to Her Majesty the Queen in right of Canada as represented by the Postmaster General, Ottawa, Ontario, Canada
Filed July 30, 1962, Ser. No. 213,195
4 Claims. (Cl. 198—185)

This invention relates to improvements in conveyor belt systems of the type that incorporate a deflector for deflecting articles off the conveyor belt at selected stations therealong or while travelling back and forth along the belt. The principal purpose for which the present invention has been developed is the handling of mail in post offices, and consequently it will be explained below in relation to such purpose. It must, however, be appreciated that this is essentially exemplary, and that the principles involved are capable of application to conveyor systems for handling other articles, for which reason the invention in its broad scope extends to such other systems.

The main utility of the present system, as applied to mail handling, is for carrying out a preliminary sorting of mail received at a post office. This mail is typically received in bags, usually conveyed to the post office in a van or railway car, so that a large number of bags arrive together. Prior to the main sorting, it is desired to spread the mail out over a large smooth surface (commonly referred to as a glacis). The glacis is sometimes divided into separate stations by physical barriers; sometimes it is merely an extended surface, the different areas of which constitute individual sorting or handling stations merely by virtue of their mutual spacing.

As the mail is received, it is required to be distributed to these various stations. This distribution may be random (each successive batch of mail going to the next successive station) merely to spread the mail out into workable quantities at each station, or it may follow some prearranged programme related to the nature of each batch of mail (e.g. mail from one origin to one station, and so on; presorted mail to a given station; parcel mail to a selected station etc.).

Such manner of mail handling is conventional, and it is further conventional to achieve this result by placing the mail, batch after batch, as it is received, on a conveyor belt which travels along the full length of the glacis in an elevated position, the glacis including an apron portion leading down from the side of the conveyor belt to the working stations. A deflector is provided to deflect each batch of mail transversely off the belt down the glacis apron to a working station, the particular station being selected by positioning the deflector at a corresponding location along the conveyor belt. The deflector is hence called a travelling deflector. The deflector may be stationary when deflecting mail, being indexed along the conveyor from station to station (either manually or by automatic controls) between receiving batches of mail. Alternatively, the deflector may be normally moving, being cycled (or indexed) back and forth along the conveyor belt between stations, which stations may either be fixed (in the sense that they are predetermined) or arbitrarily selected at will by the operator to suit particular operational requirements existing at any given moment. The stations between which cycling takes place are not necessarily adjacent, and deflecting of mail may occur whilst the deflector is moving in either direction. Manual, semi-automatic or automatic controls may be incorporated for use as circumstances dictate.

A difficulty that has been encountered in the past with deflectors constructed for this purpose is to ensure deflection of all articles of mail at the selected station. The deflector member itself consists of a sloping blade, something like a plow blade, against which the articles of mail travelling with the belt come to bear. This blade is set at an inclination to the transverse direction of the belt, so that it deflects the mail to the side and out onto the glacis. Parcels and bulky letters contact the blade with no trouble, but thin letters lying flat on the conveyor belt may pass under the blade, or worse, be damaged or mutilated by becoming jammed between the blade and the moving belt. An obvious expedient would be to force the blade down hard onto the belt surface to leave no possible space for the letter to pass underneath. But this method has not been found satisfactory in practice; it results in excessive wear on the rubbing parts (belt and blade), and yet still fails to ensure proper deflection of all pieces of mail. Minor irregularities existing in the belt surface can allow the corners of letters to become wedged between blade and belt. If this does happen, the added pressure between blade and belt increases the destructive effect on the jammed mail.

The present invention has furnished a solution to this problem by providing a lip or other upstanding means secured to the deflector (so as to move from station to station along the belt with it) extending beneath the belt generally parallel to and closely in advance of the deflector blade. Such lip means will bear upwardly against the underside of the belt to form a hump in it immediately in advanced of the blade. The manner in which this hump will improve the performance of the deflector blade will appear more fully and clearly from the specific example of the invention which is described below and illustrated in the accompanying drawings.

It is to be understood that such specific description and illustration are provided by way of example only, and that the scope of the invention is limited only by the appended claims.

FIGURE 1 shows a general perspective view of a portion of a post office mail handling lay-out, incorporating the invention;

FIGURE 2 is an elevation view of the deflector used therein;

FIGURE 3 is a plan view taken on III—III in FIGURE 2 with the conveyor belt partly cut away;

FIGURE 4 is an end view taken on IV—IV in FIGURE 2 partly broken away and sectioned, this view being somewhat idealised in order better to show the parts than a true section would; and FIGURE 5 is an enlarged section taken on V—V in FIGURE 3.

As FIGURE 1 shows, a glacis 10 divided into stations 11 is serviced by a conveyor belt 12, onto the receiving end of which (not shown) pieces of mail are dumped either manually or by some other conveyor system. This mail is deflected onto the glacis 10 by a deflector 13 shown in more detail in FIGURES 2 to 5. Another position that the deflector 13 may occupy is shown in ghost in FIGURE 1.

The deflector 13 consists of a framework 14 mounted on free running rollers 15 and aligned by rollers 16 cooperating with fixed rail surfaces 17 and 18. The positioning and traversing of the deflector 13 is controlled by a drive chain 19 secured to the deflector 13 and controlled by motors (not shown). The essential part of the deflector 13 is a so-called plow blade 20 which extends across the deflector from one side to the other of the belt 12 at a sufficient inclination to the transverse direction to be effective in deflecting mail pieces to one side. As FIGURE 5 shows, the blade 20 is hinged at 21 to the deflector framework 14, arms 22 extending rearwardly from the underside of the blade 20, a tension spring 23 extending between the free end of each arm 22 and a fixed connection at 24 to the framework. If desired these springs can incorporate means for adjusting their tension and hence varying the force urging the blade edge down into contact with the belt 12.

Secured at its edges to the lower part of the deflector framework 14 so as to underlie the belt 12, is a slider bed 30. The undersurface of the slider bed 30 is fitted with a number of skids 31 which rest on the fixed bed 32 of the belt 12 thus minimising friction between these two beds when the deflector is moving from station to station. Along its leading edge, which is parallel with and closely in advance of the edge of the blade 20, the slider bed 30 is fitted with a smooth, upstanding lip 33 which bears against the underside of the belt 12 to produce a hump 34 therein that extends across the full width of the belt 12 along a line situated immediately in advance of the blade 20 and extending at the same inclination to the direction of belt travel as the blade 20.

By virtue of its fixing by brackets 35 to the deflector framework 14, the slider bed 30 travels lengthwise of the fixed bed 32 with the deflector 13, so that the relative position of the lip 33 and the blade 20 remains constant once initially set. Adjustment in this regard will be provided for in the brackets 35 securing the slider bed 30 to the deflector framework. The optimum spacing of the lip from the blade edge will be chosen to a large extent empirically, having regard mainly to the thickness and flexibility of the conveyor belt and the tension in springs 23. These factors will preferably be so adjusted that the spacing of lip from blade is a few inches, that is to say of the order of magnitude of the shorter dimension of a typical letter. The effect of the hump 34 will be to tend to raise the leading edge of a letter lying on the belt. If the leading edge is still elevated when the letter reaches the blade, satisfactory sideways deflection of the letter is virtually ensured; but, even if the leading edge fails to remain elevated, practical experience has shown that passage of the letter over the hump will have disturbed the letter sufficiently to overcome the tendency that letters sometimes exhibit of clinging tightly to the belt as a result of electrostatic forces or the pressure of other superposed pieces of mail. As a result, it has been found possible to exert only a comparatively light downward pressure on the blade 20 by springs 23 without loss of deflecting performance, and indeed with improved performance both in reliability of deflection and reduced risk of damage to the mail.

The simplest form of lip 33, namely a smoothly curved "half round" has been employed for convenience. If preferred, a free running roller could be used, supported on the slider bed 30 clear of the fixed bed 32 in an upper position to engage the undersurface of the belt 12.

I claim:
1. In a conveyor system having
   (a) a movable conveyor belt,
   (b) and a deflector stationable at and traversable between selected positions therealong, such deflector including a plow blade for deflecting articles from the belt;
   (c) the improvement comprising means secured to said deflector extending beneath the belt generally parallel to and closely in advance of said blade to bear upwardly against the underside of the belt to form a hump therein, the peak of said hump being situated in advance of said blade, and means urging said blade downwardly into contact with the upper surface of a portion of the belt sloping downwardly from the peak of the hump.

2. A conveyor system comprising
   (a) a fixed bed,
   (b) a conveyor belt movable along said bed,
   (c) a deflector positioned above said belt and including a plow blade for deflecting articles from said belt,
   (d) means urging said blade downwardly into contact with the upper surface of said belt,
   (e) means for moving said deflector from station to station along said belt,
   (f) a slider bed interposed between said fixed bed and said belt and secured to said deflector to move therewith,
   (g) upstanding means mounted on said slider bed to extend across the full width of the belt generally parallel to and closely in advance of said blade,
   (h) said means bearing upwardly against the underside of the belt to form a hump therein, the peak of said hump being situated in advance of said blade so that the blade engages a portion of the belt sloping downwardly from said peak.

3. A conveyor system as claimed in claim 2, wherein said upstanding means comprises a smoothly curved lip.

4. A conveyor system as claimed in claim 2, wherein said slider bed has skids attached to its undersurface, said skids sliding on said fixed bed.

References Cited in the file of this patent
UNITED STATES PATENTS

| | | |
|---|---|---|
| 549,839 | Acken | Nov. 12, 1895 |
| 930,138 | Bonnie | Aug. 3, 1909 |
| 1,109,284 | Friel | Sept. 1, 1914 |